United States Patent
Xu et al.

(10) Patent No.: US 7,579,988 B2
(45) Date of Patent: Aug. 25, 2009

(54) METHOD, DEVICE AND SYSTEM FOR DETERMINING DIRECTION OF ARRIVAL OF SIGNAL

(75) Inventors: Jin Xu, Singapore (SG); Yugang Ma, Singapore (SG); Xiaobing Sun, Singapore (SG); Kanzo Okada, Singapore (SG)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/823,478

(22) Filed: Jun. 26, 2007

(65) Prior Publication Data
US 2008/0012765 A1 Jan. 17, 2008

(30) Foreign Application Priority Data
Jun. 27, 2006 (SG) .............................. 200604421-8

(51) Int. Cl.
*G01S 5/02* (2006.01)
*G01S 5/04* (2006.01)
*G01S 7/40* (2006.01)

(52) U.S. Cl. .................. 342/417; 342/174; 342/442
(58) Field of Classification Search .............. 342/173, 342/174, 417, 434, 437, 442
See application file for complete search history.

(56) References Cited

U.S. PATENT DOCUMENTS

| 4,752,969 | A |  | 6/1988 | Rilling |  |
|---|---|---|---|---|---|
| 5,361,072 | A | * | 11/1994 | Barrick et al. | 342/133 |
| 6,700,536 | B1 | * | 3/2004 | Wiegand | 342/417 |
| 6,898,235 | B1 | * | 5/2005 | Carlin et al. | 375/219 |
| 2003/0137454 | A1 |  | 7/2003 | Alexander |  |

FOREIGN PATENT DOCUMENTS

| EP | 1596217 A1 | 11/2005 |
|---|---|---|
| SG | 200504866-5 | 7/2005 |

OTHER PUBLICATIONS

Samuel M. Sherman, "*Monopulse Principles and Techniques*," Artech House, Inc. (1984). (referenced in p. 15 of specification).
A. I. Leonov and K. I. Fomichev "*Monopulse Radar*,", Artech House, Inc. (1986). (referenced in p. 15 of specification).

* cited by examiner

*Primary Examiner*—Dao L Phan
(74) *Attorney, Agent, or Firm*—Lerner, David, Littenberg, Krumholz & Mentlik, LLP

(57) ABSTRACT

A method, device and system for determining a DOA of a signal are described. Determination of the DOA of the signal may include receiving first and second UWB waveforms of the signal at one or more antennas of a UWB transceiver. A window may be defined in the first and second UWB waveforms such that the window is defined in a leading portion of the signal. First and second amplitude values of the respective first and second UWB waveforms in the window may be calculated. An amplitude ratio may be calculated with the first and second amplitude values and compared with calibration data to determine the DOA of the signal.

21 Claims, 6 Drawing Sheets

— PRIOR ART —

— PRIOR ART —

— PRIOR ART —

METHOD, DEVICE AND SYSTEM FOR DETERMINING DIRECTION OF ARRIVAL OF SIGNAL

CROSS-REFERENCE TO RELATED APPLICATIONS

This application claims priority from Singapore Patent Application No. SG 200604421-8 filed in the Singapore Patent Office on Jun. 27, 2006, the entire content of which is incorporated herein by reference.

FIELD OF THE INVENTION

The present invention relates to wireless positioning systems and more particularly to a method, device and system for determining a DOA of a signal.

BACKGROUND OF INVENTION

Monopulse, also known as simultaneous lobe comparison, is a technique for determining the direction of arrival (DOA) of radiation. The radiation may emanate from an active source, for example, a transceiver, a transponder or a beacon, or a passive source, that is, a target or scatterer that reradiates some of the power incident on it. The working principle of the monopulse technique for DOA determination is described below with reference to FIG. 1.

Referring now to FIG. 1, a schematic top plan view of a conventional monopulse system 10 is shown. The monopulse system 10 includes a beacon 12 and a receiver 14. The beacon 12 is at a distance R from the receiver 14 and an angle θ from a boresight axis z of the receiver 14. The beacon 12 at position (R, θ) is received by identical first and second antenna patterns 16 and 18 at the receiver 14. The first and second antenna patterns 16 and 18 shown in FIG. 1 are realised by sequential lobing. However, although only one (1) receiver 14 is shown in FIG. 1, the first and second antenna patterns 16 and 18 can alternatively be realised by real simultaneous beams with two (2) receivers. The DOA θ of a signal from the beacon 12 is estimated based on a comparison of the amplitudes of the first and second antenna patterns 16 and 18, and more particularly by computing an angle estimator Δ/Σ denoting a ratio of the difference to the sum of the amplitudes of the first and second antenna patterns 16 and 18 with the following equation:

$$\frac{\Delta}{\Sigma} = \frac{f_1(\theta) - f_2(\theta)}{f_1(\theta) + f_2(\theta)} \quad (1)$$

where $f_1(\theta)$ represents the first antenna pattern 16, and $f_2(\theta)$ represents the second antenna pattern 18. Monopulse technology is discussed in greater detail in "*Monopulse Principles and Techniques*," by Samuel M. Sherman, Artech House, Inc. (1984) [1] and "*Monopulse Radar*," by A. I. Leonov and K. I. Fomichev, Artech House, Inc. (1986) [2].

Monopulse technology is widely employed in radar applications, particularly in long-range radar applications having line of sight (LOS) conditions, for determining the angular location of a target. Most recently however, with the United States Federal Communications Commission's (FCC) approval of the commercial use of Ultra Wideband (UWB), an UWB-based monopulse system for position determination in an indoor environment has been proposed in Singapore Patent Application No. SG 200504866-5 by Sun Xiao Bing, et al. [3].

SG 200504866-5 [3] describes a UWB positioning system comprising a UWB transceiver and a UWB reference device. The reference device generates UWB response pulses in response to UWB pulses received from the transceiver. The transceiver includes multiple antennas and circuitry for determining the amplitudes of respective signals received by the antennas from the reference device in response to UWB pulse(s) transmitted from the transceiver. The signal amplitudes from the different antennas are compared to determine the DOA of the response pulse.

Referring now to FIG. 2, first and second waveforms 20 and 22 received by the prior art transceiver in an office environment with no large reflectors in proximity are shown. Samples of the first and second waveforms 20 and 22 (i.e. samples $N_1$ to $N_2$) are used in amplitude calculations for determining the DOA of the response pulse. Due to the short period of the UWB pulses (typically between about 1 to 2 nanoseconds), multipath effects are substantially suppressed by time-gating applied to the prior art UWB positioning system. Accordingly, the samples $N_1$ to $N_2$ are substantially from the direct path signal. However, in applications where the prior art UWB positioning system operates in proximity, for example, less than 1 meter (m), to a sizable reflector such as a wall, multipath signals resulting from mirror reflection of the response pulse off the reflector are typically of significant amplitudes and tend to interfere with the direct signal. Referring now to FIG. 3, first and second waveforms 24 and 26 received when the prior art transceiver is operating in proximity to a wall in the office environment are shown. In particular, the first and second waveforms 24 and 26 are collected at two antennas of the prior art transceiver, the two antennas having a 60 degree (°) squint angle therebetween, when the prior art transceiver is operating at a distance of 40 centimeters (cm) from the wall. Due to interference from multipath signals reflected off the wall, the first and second waveforms 24 and 26 in FIG. 3 differ substantially from the first and second waveforms 20 and 22 received by the prior art transceiver in the LOS application shown in FIG. 2. The presence of multipath signals introduces errors in the DOA of the response pulse estimated with samples $N_1$ to $N_2$ from the first and second waveforms 24 and 26 in FIG. 3.

In view of the foregoing, it would be desirable to have a method that provides a substantially accurate estimate of a DOA of a signal in applications with severe multipath.

SUMMARY OF THE INVENTION

In order to meet the above, embodiments of the present invention provide a method, device and system for which may determine a DOA of a signal that give a substantially accurate estimate of the DOA even in applications with severe multipath effects. By utilising a leading portion of the signal in the determination of the DOA, errors introduced due to the presence of multipath signals may be substantially reduced.

In view of the above, from a first aspect there is provided a method for determining a DOA of a signal, which may comprise receiving first and second UWB waveforms of the signal at one or more antennas of a UWB transceiver; defining a window in the first and second UWB waveforms, wherein the window is defined in a leading portion of the signal; calculating first and second amplitude values of the respective first and second UWB waveforms in the window; calculating an amplitude ratio with the first and second amplitude values; and comparing the amplitude ratio with calibration data to determine the DOA of the signal.

Embodiments of the invention according to the first aspect may provide the advantage set out above.

Preferably, the calibration data obtained from a calibration process may be established from a leading portion of a calibration signal. This accounts for differences in the effective UWB spectrum of the calibration signals when different segments of the calibration signals are used, thereby providing a more accurate estimate of the DOA. The calibration data obtained from the calibration process may be stored in a lookup table or as a function derived from plotting the calibration data as a calibration curve. The calibration process preferably is performed in a free space environment.

In a preferred embodiment, the first and second UWB waveforms received at the UWB transceiver may be accumulated by summing results from a plurality of pulses. This may compensate for a decrease in signal-to-noise-ratio (SNR) caused by the fact that only the leading portion of the signal (typically not a peak portion of the signal) is used in the amplitude calculations, as the signal adds up while noise tends to cancel.

The window may be defined by sample size. The first and second amplitude values may be one or more of a peak to peak value and a root mean square (RMS) value of the respective first and second UWB waveforms in the window.

Preferably, the step of calculating the amplitude ratio comprises computing a difference between the first and second amplitude values and a sum of the first and second amplitude values. Preferably, the step of calculating the amplitude ratio further comprises computing a ratio of the difference to the sum of the first and second amplitude values.

From a second aspect, the invention may further provide a device for determining a DOA of a signal, comprising one or more antennas configured to receive respective first and second UWB waveforms of the signal; a memory for storing calibration data; and one or more processors configured to define a window in the first and second UWB waveforms received at the one or more antennas, calculate first and second amplitude values of the respective first and second UWB waveforms in the window, calculate an amplitude ratio with the first and second amplitude values, and compare the amplitude ratio with the calibration data stored in the memory to determine the DOA of the signal, wherein the window is defined in a leading portion of the signal.

From a third aspect, the invention may further provide a system for determining a DOA of a signal, comprising a transponder for generating the signal in response to receipt of a UWB pulse; and a transceiver arranged to receive the signal generated by the transponder, the transceiver being a device for determining the DOA of the signal as described above.

In the second and third aspects, corresponding advantages are obtained as previously described in respect of the first aspect. Moreover, corresponding further features as described above in respect of the first aspect may also be employed.

Other aspects and advantages of the invention will become apparent from the following detailed description, taken in conjunction with the accompanying drawings, illustrating by way of example the principles of the invention.

BRIEF DESCRIPTION OF THE DRAWINGS

The following detailed description of embodiments of the invention will be better understood when read in conjunction with the appended drawings. The present invention is illustrated by way of example and is not limited by the accompanying figures, in which like references indicate similar elements.

DETAILED DESCRIPTION

Figure 1:
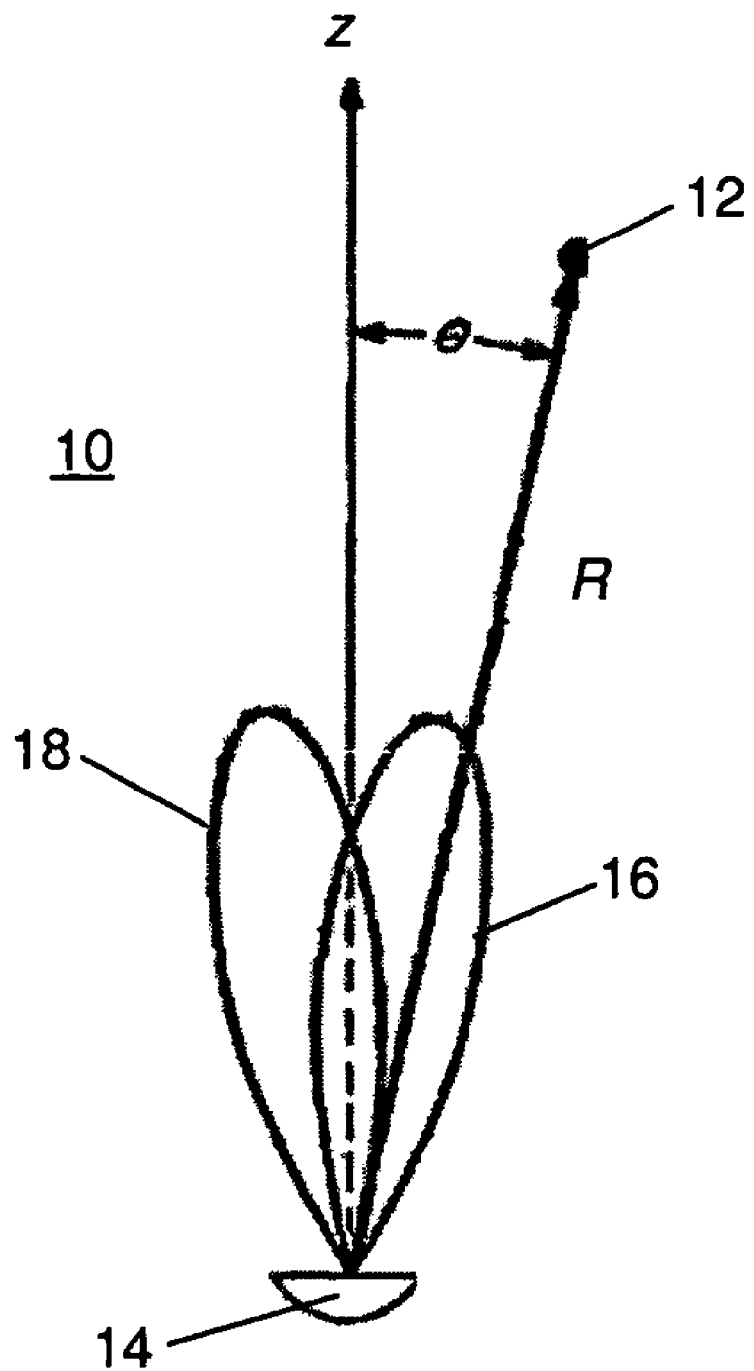
FIG. 1 is a schematic top plan view of a conventional monopulse system.
Figure 2:
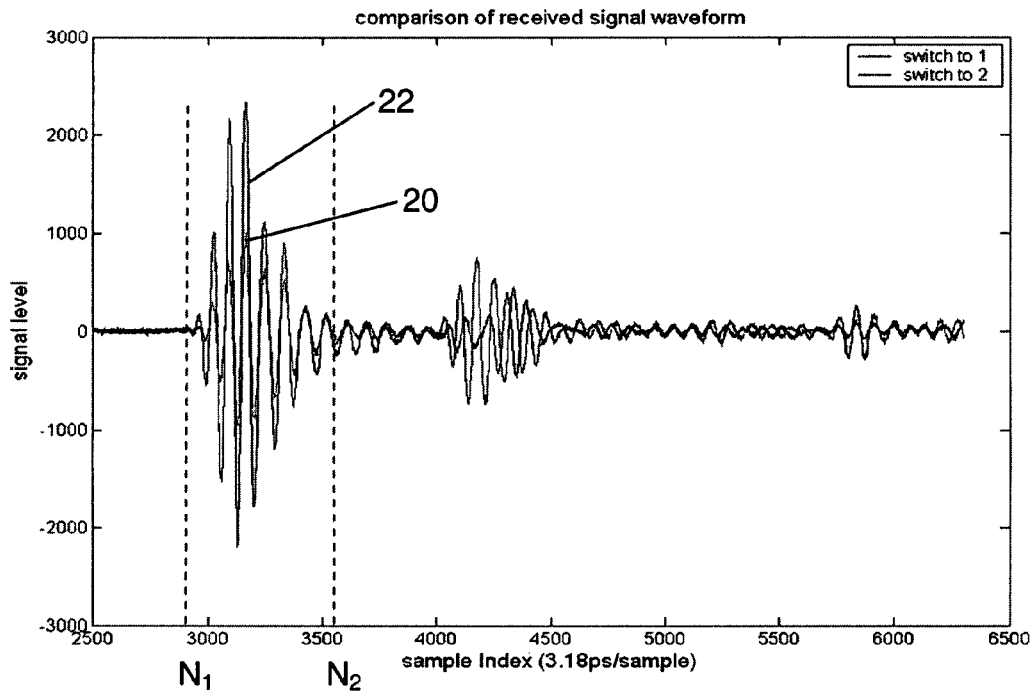
FIG. 2 shows first and second waveforms received by a prior art transceiver in an office environment.
Figure 3:
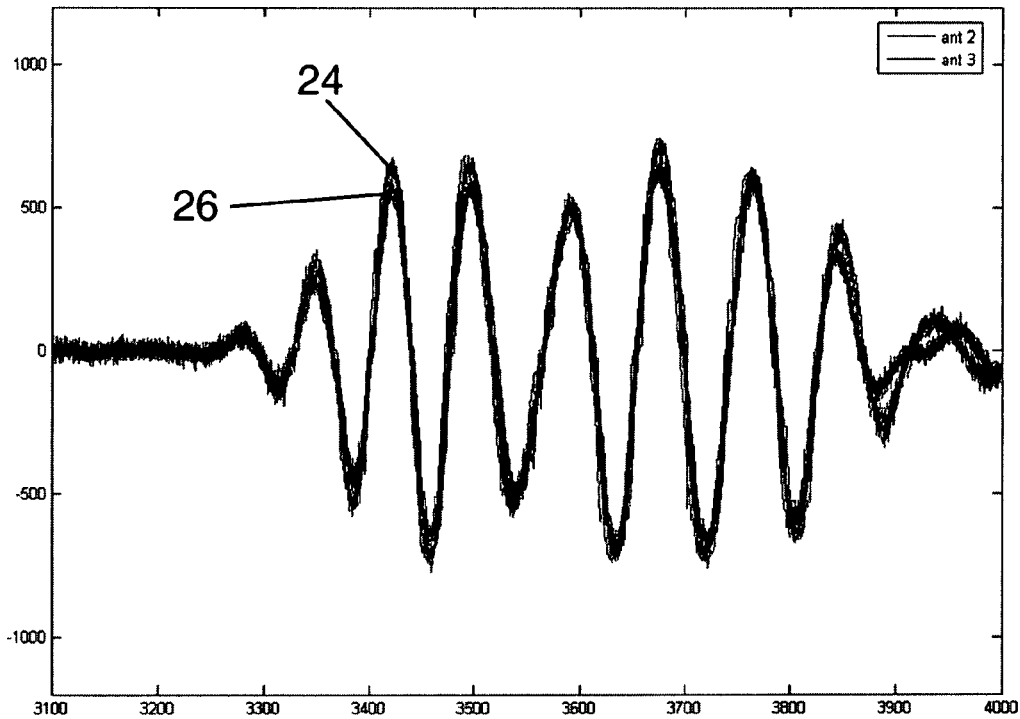
FIG. 3 shows first and second waveforms received by the prior art transceiver when operating in proximity to a wall in the office environment.

The detailed description set forth below in connection with the appended drawings is intended as a description of embodiments of the invention, and is not intended to represent the only form in which the present invention may be practiced. It is to be understood that the same or equivalent functions may be accomplished by different embodiments that are intended to be encompassed within the spirit and scope of the invention. In the drawings, like numerals are used to indicate like elements throughout.

Figure 4:
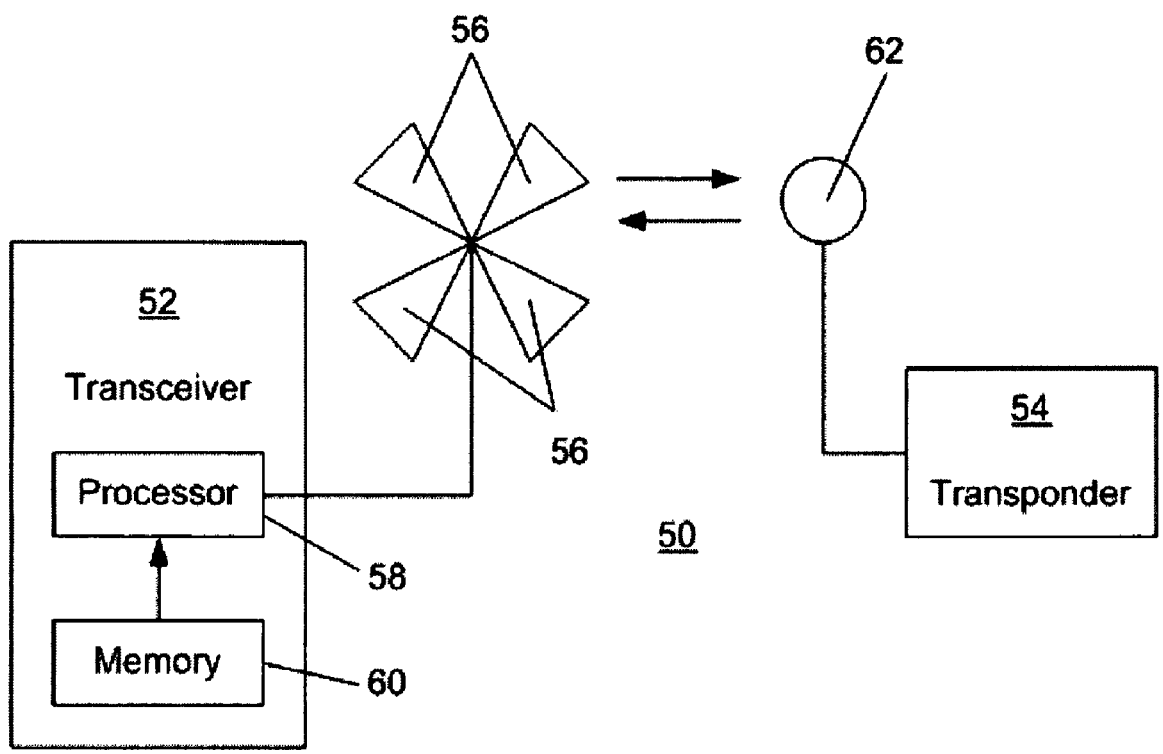
FIG. 4 is a schematic diagram of a system for determining a DOA of a signal in accordance with one embodiment of the present invention.

Referring now to FIG. 4, a system 50 for determining a DOA of a signal is shown. The system 50 comprises a transceiver 52 and a transponder 54. The transceiver 52 includes multiple directional antennas 56, a processor 58 and a memory 60 for storing calibration data. The transponder 54 includes an omni-directional antenna 62. The signal whose DOA is to be determined is generated by the transponder 54 in response to receipt of a UWB pulse. Adjacent pairs of the directional antennas 56 are configured to receive respective first and second UWB waveforms of the signal.

In this particular embodiment, the transceiver 52 is a UWB reader in a fixed location, while the transponder 54 is a mobile UWB tag. The transceiver 52 serves as a reference for determining the location of the transponder 54. The directional antennas 56 in this particular embodiment are arranged and interconnected to form an antenna array covering a 360° radius. Although four (4) directional antennas 56 are shown in this embodiment, those of skill in the art will understand that the present invention is not limited by the number of antennas 56 in the transceiver 52; the transceiver 52 may have fewer or more antennas 56. For example, the transceiver 52 may have a single rotating antenna covering a 360° radius in an alternative embodiment. Further, it should be understood that the present invention is not limited to transponders having omni-directional antennas.

Having described the various components of the system 50, the operation of these components will now be described in greater detail below with reference to FIGS. 4 through 8.

In the present embodiment, the UWB pulse that triggers the generation of the signal by the transponder 54 is transmitted by the transceiver 52. On receiving the UWB pulse, the transponder 54 generates a response UWB pulse (i.e. the signal).

Figure 5:
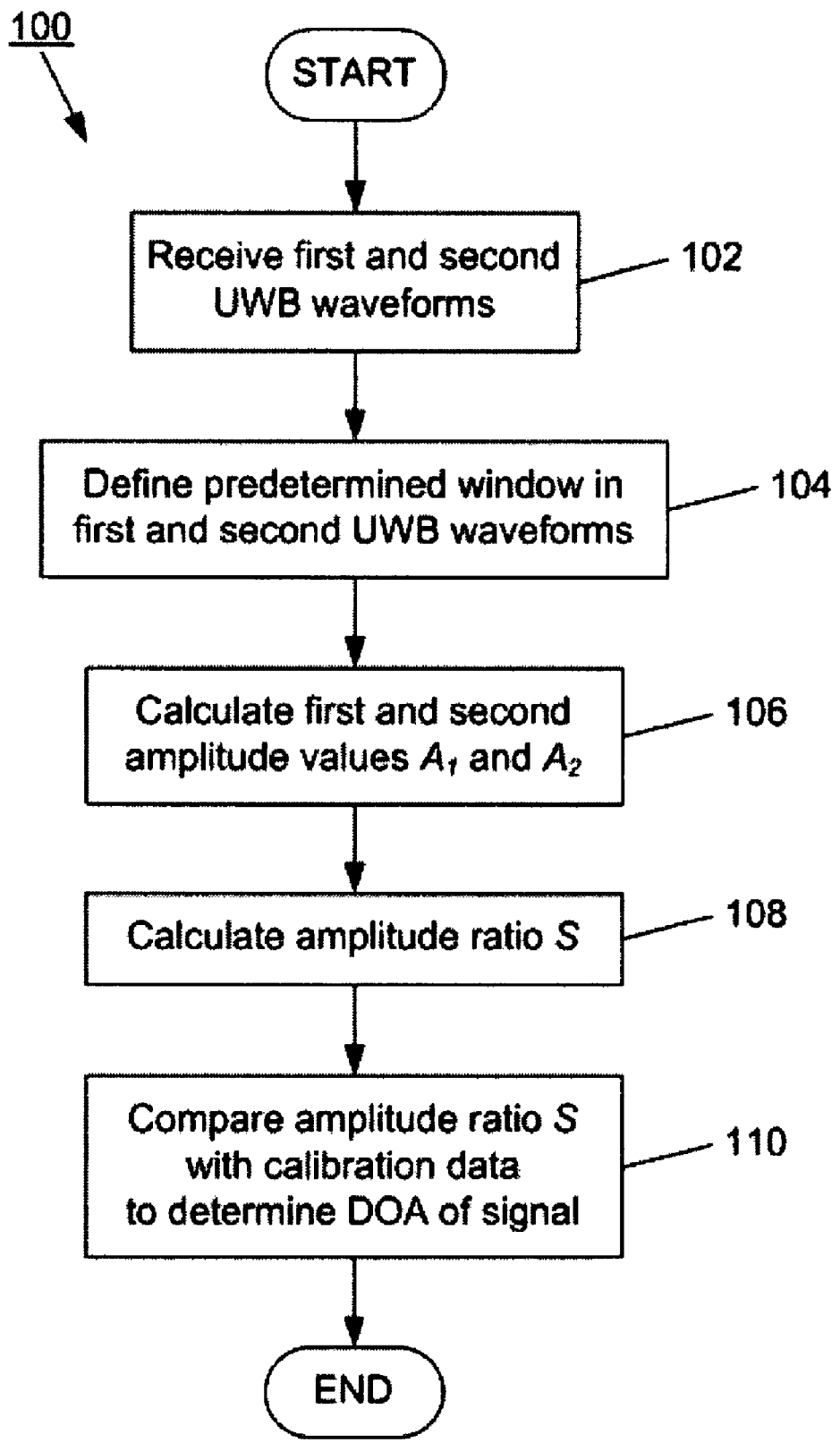
FIG. 5 is a schematic flow diagram illustrating a method for determining a DOA of a signal in accordance with another embodiment of the present invention.
Figure 6:
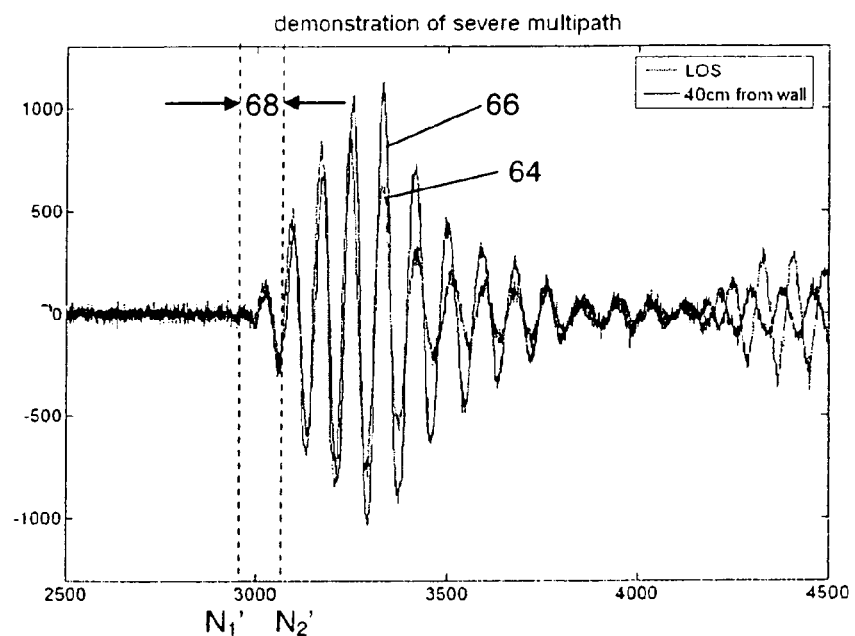
FIG. 6 shows first and second UWB waveforms received at first and second antennas of the transceiver of FIG. 4.

Referring now to FIG. 5, a schematic flow diagram illustrating a method 100 for determining the DOA of the signal is shown. In a first step 102, first and second UWB waveforms of the signal are received at respective first and second antennas 56 of the UWB transceiver 52. An example of first and second UWB waveforms 64 and 66 received at the antennas 56 of the transceiver 52 is shown in FIG. 6. The first and second UWB waveforms 64 and 66 are reconstructed from samples of the response UWB pulses received at the antennas 56 of the transceiver 52.

Optionally, sequential lobing may be realised by electrical switching between the antennas, which makes it unnecessary to implement mechanical scanning or the use of a Radio Frequency (RF) mixer.

Referring now to FIGS. 4, 5 and 6, the processor 58 is configured to define a window 68 in the first and second UWB waveforms at step 104. As can be seen from FIG. 6, the window 68 is defined in a leading portion of the signal. Because multipath signals travel a further distance, they always arrive at an interval of time after direct path signals. Thus, the leading portion of the signal is substantially free of multipath. Accordingly, errors in the estimated DOA due to multipath effects are substantially avoided through the use of the leading portion of the signal for DOA determination. The leading portion may comprise at least about the first 20 percent (%) of the signal. Nonetheless, it should be understood that the present invention is not limited by the size of the leading portion of the signal. Rather, the size of the leading portion of the signal is dependent on the proximity of the DOA determination system 50 to a sizable reflector. The nearer the system 50 is to the sizable reflector, the smaller the size of the leading portion of the signal.

As shown in FIG. 6, the window 68 is defined by sample size s (i.e. samples $N_1'$ to $N_2'$). The processor 58 is configured to determine the sample size s based on a time delay $\tau$ between arrival of a direct signal and the multipath. The processor 58 is further configured to determine the time delay $\tau$ based on a differential displacement $\Delta P$ between a direct path and a reflected path travelled by the signal. The magnitude of the differential displacement $\Delta P$ is dependent on the displacement between the transceiver 52 and the transponder 54. In particular, the differential displacement $\Delta P$ is smaller when the transceiver 52 and the transponder 54 are further apart. The sample size s, and hence the window 68, is predetermined based on the maximum separation between the transceiver 52 and the transponder 54 (i.e. the smallest possible value of the differential displacement $\Delta P$). An example of sample size s determination is described below with reference to FIG. 7.

Figure 7:
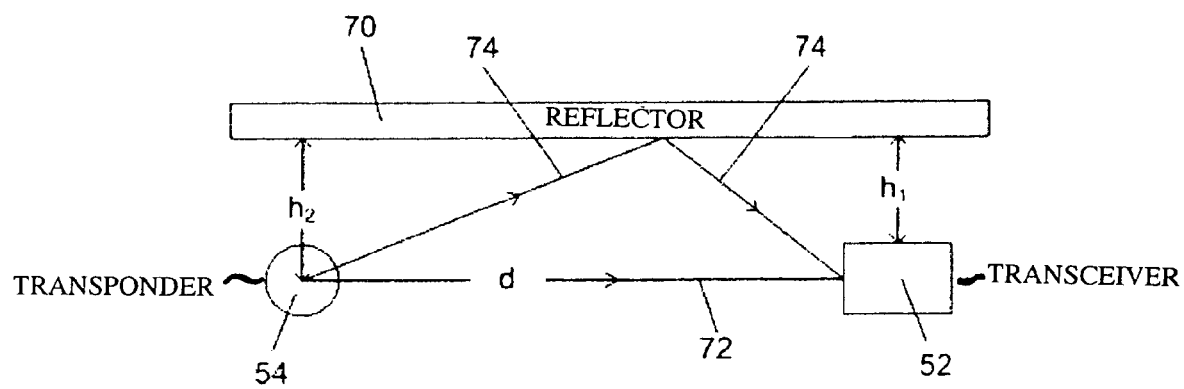
FIG. 7 is a top plan view of the transceiver and the transponder of FIG. 4 operating in proximity to a sizable reflector.

FIG. 7 shows the transceiver 52 and the transponder 54 operating in proximity to a sizable reflector 70, in this instance, a wall. The transceiver 52 and the transponder 54 are at a distance d from each other and each is a distance $h_1$ and $h_2$, respectively, away from the wall 70. A signal emitted by the transponder 54 is received by the transceiver 52 as a direct signal and as multipath reflected off the wall 70. The direct signal traverses a direct path 72 to the transceiver 52, while the multipath traverses a reflected path 74. The differential displacement $\Delta P$ between the direct path 72 and the reflected path 74 travelled by the signal is expressed by the following equation:

$$\Delta P = \sqrt{(h_1+h_2)^2+d^2} - d \qquad (2).$$

In this particular example, the transceiver 52 and the transponder 54 are 3 m away from each other and each is 40 cm away from the wall 70. Applying equation (2) to the present example, the differential displacement $\Delta P$ between the direct path 72 and the reflected path 74 travelled by the signal is calculated to be about 10 cm.

The time delay $\tau$ between arrival of the direct signal and the multipath is determined based on the differential displacement $\Delta P$ between the direct path 72 and the reflected path 74 with the following equation:

$$\tau = \frac{\Delta P}{c} \qquad (3)$$

where c represents the speed of light (i.e. $3 \times 10^8$ ms$^{-1}$). Applying equation (3), the time delay $\tau$ in this particular example is calculated to be about 0.3 nanoseconds (ns). Therefore, although the window 68 is defined in only the leading portion of the signal, the delay time $\tau$ still constitutes a significant portion of the first and second UWB waveforms 64 and 66 due to the short pulse width—typically about 1 ns—of the UWB signal.

The sample size s is then determined based on the time delay $\tau$ between arrival of the direct signal and the multipath using the following equation:

$$s = \frac{\tau}{t} \qquad (t)$$

where t represents the sampling period, that is, the time difference between consecutive samples in the first and second UWB waveforms 64 and 66. Applying equation (4) to the present example with a sampling period t of 3.2 picoseconds (ps) per sample, the window 68 is calculated to be defined by a sample size s of about 90 samples.

To compensate for a decrease in signal-to-noise-ratio (SNR) as only the leading portion of the signal (typically not a peak portion of the signal) is used in subsequent amplitude calculations, the processor 58 is configured to accumulate the first and second UWB waveforms 64 and 66 received at the transceiver 52, that is, the processor 58 sums each sample received at the transceiver 52 multiple times. Because the signal is stable while noise is typically random, the signal is accumulated and noise is cancelled out when the samples are summed. This increases the SNR. In one embodiment, the samples are summed about sixteen (16) times. This corresponds to an increase in the SNR by about 24 decibels (dB).

Referring back to FIGS. 4, 5 and 6, the processor 58 is configured to calculate first and second amplitude values $A_1$ and $A_2$ of the respective first and second UWB waveforms 64 and 66 in the window 68 at step 106, and to calculate an amplitude ratio S with the first and second amplitude values $A_1$ and $A_2$ at step 108. More particularly, the processor 58 is configured to compute a difference $A_1-A_2$ between the first and second amplitude values $A_1$ and $A_2$, a sum $A_1+A_2$ of the first and second amplitude values $A_1$ and $A_2$, and a ratio S of the difference $A_1-A_2$ to the sum $A_1+A_2$ of the first and second amplitude values $A_1$ and $A_2$. The amplitude ratio S is expressed by the following equation:

$$S = \frac{A_1 - A_2}{A_1 + A_2} \qquad (5)$$

The first and second amplitude values $A_1$ and $A_2$ may be one or more of a peak to peak value and a root mean square (RMS) value of the respective first and second UWB waveforms 64 and 66 in the window 68.

Referring now to FIGS. 4 and 5, the processor 58 is further configured to compare the amplitude ratio S with the calibration data stored in the memory 60 to determine the DOA of the signal at step 110. The calibration data is obtained from a separate calibration process. In one embodiment, the calibration process is performed in a free space environment. The calibration data obtained from the calibration process may be stored in a lookup table or as a function derived from plotting the calibration data as a calibration curve.

Figure 8:
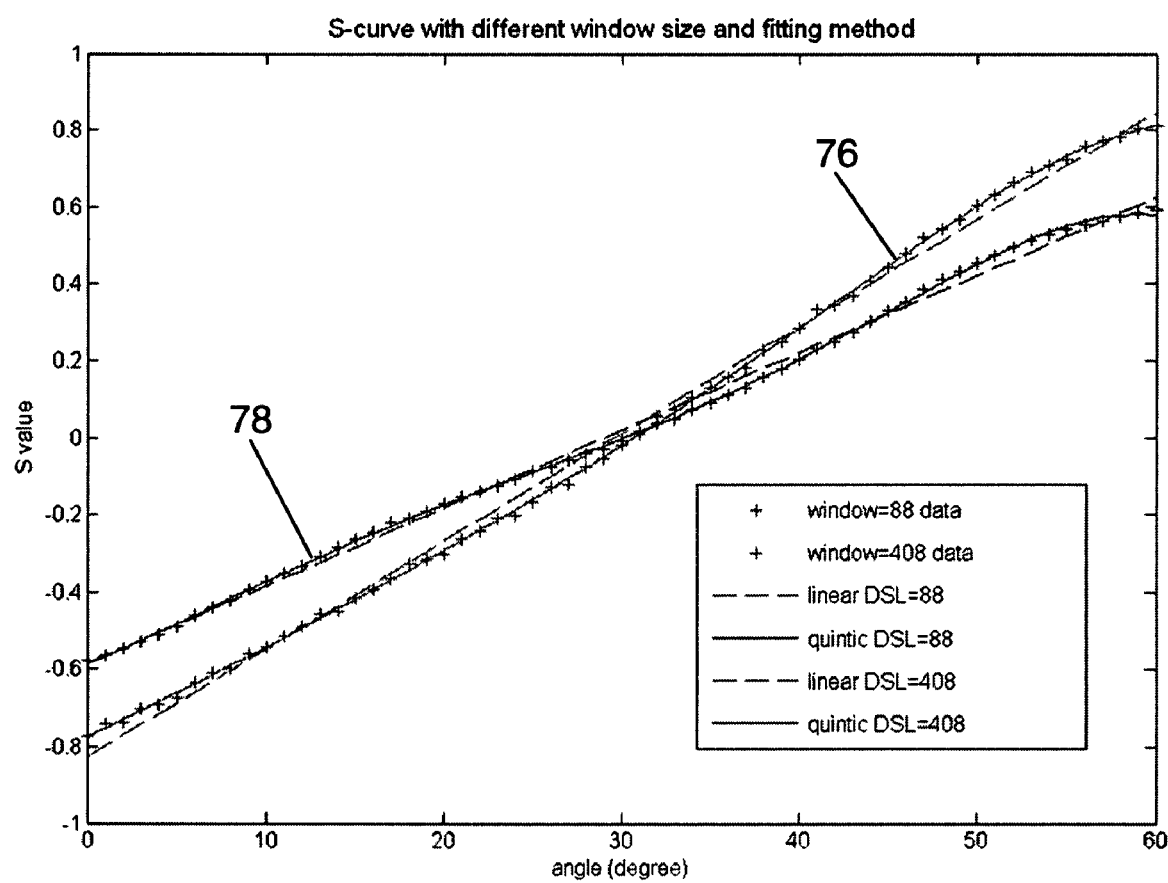
FIG. 8 shows first and second calibration curves in accordance with embodiments of the present invention.

Referring now to FIG. 8, first and second calibration curves 76 and 78 are shown. More particularly, linear and quintic (i.e. fifth-order) fittings of calibration data are shown in FIG. 8. Both the first and second calibration curves 76 and 78 are plotted with calibration data derived from the same calibration signals. However, the first calibration curve 76 is plotted with calibration data established from leading portions of the calibration signals (i.e. defined by a window of 88 samples), whereas the second calibration curve 78 is plotted with calibration data established from full spectrums of the calibration signals (i.e. defined by a window of 408 samples). The larger window of 408 samples covers a wider range of the UWB spectrum compared to the smaller window of 88 samples applied to leading portions of the UWB calibration signals. Because antenna patterns of the directional antennas 56 are dependent on the UWB spectrum of the calibration signals, the "effective" antenna patterns of the directional antennas 56 of the transceiver 52 differ when different segments of the calibration signals are used. Hence, as can be seen from FIG. 8, there are significant differences between the first and second calibration curves 76 and 78. A more accurate estimate of the DOA of the signal is obtained with calibration data established from leading portions of the calibration signals.

The description of the preferred embodiments of the present invention have been presented for purposes of illustration and description, but are not intended to be exhaustive or to limit the invention to the forms disclosed. It will be appreciated by those skilled in the art that changes could be made to the embodiments described above without departing from the broad inventive concept thereof. For example, although only one (1) processor is shown in the embodiment described, those of skill in the art will appreciate that the present invention is not limited by the number of processors in the transceiver; the steps of defining the window in the first and second UWB waveforms, calculating the first and second amplitude values, calculating the amplitude ratio, and comparing the amplitude ratio with the calibration data to determine the DOA of the signal may be performed by one or more processors in the transceiver. Furthermore, although the present invention is described as being applied to a system near a wall, it should be understood that the present invention can also be applied in other settings, for example, to systems near the ground or on top of desks. It is understood, therefore, that this invention is not limited to the particular embodiments disclosed, but covers modifications within the spirit and scope of the present invention as defined by the appended claims.

REFERENCES

[1]. *"Monopulse Principles and Techniques,"* by Samuel M. Sherman, Artech House, Inc. (1984);
[2]. *"Monopulse Radar,"* by A. I. Leonov and K. I. Fomichev, Artech House, Inc. (1986); and
[3]. *"Positioning Methods & Systems for UWB Devices,"* by Sun Xiao Bing and et al., Singapore Patent Application: SG 200504866-5 (2005).

The invention claimed is:

1. A method for determining a DOA of a signal, comprising:
    receiving first and second UWB waveforms of the signal at one or more antennas of a UWB transceiver;
    defining a window in the first and second UWB waveforms, wherein the window is defined in a leading portion of the signal;
    calculating first and second amplitude values of the respective first and second UWB waveforms in the window;
    calculating an amplitude ratio with the first and second amplitude values; and
    comparing the amplitude ratio with calibration data to determine the DOA of the signal.

2. The method for determining a DOA of a signal according to claim 1, wherein the calibration data obtained from a calibration process is established from a leading portion of a calibration signal.

3. The method for determining a DOA of a signal according to claim 2, wherein the calibration data obtained from the calibration process is stored in a lookup table.

4. The method for determining a DOA of a signal according to claim 2, wherein the calibration data obtained from the calibration process is stored as a function derived from plotting the calibration data as a calibration curve.

5. The method for determining a DOA of a signal according to any one of claims 2 to 4 inclusive, wherein the calibration process is performed in a free space environment.

6. The method for determining a DOA of a signal according to claim 1, further comprising accumulating the first and second UWB waveforms received at the UWB transceiver.

7. The method for determining a DOA of a signal according to claim 1, wherein the window is defined by sample size.

8. The method for determining a DOA of a signal according to claim 1, wherein the first and second amplitude values are one or more of a peak to peak value and a root mean square (RMS) value of the respective first and second UWB waveforms in the window.

9. The method for determining a DOA of a signal according to claim 1, wherein the step of calculating the amplitude ratio comprises computing a difference between the first and second amplitude values and a sum of the first and second amplitude values.

10. The method for determining a DOA of a signal according to claim 9, wherein the step of calculating the amplitude ratio further comprises computing a ratio of the difference to the sum of the first and second amplitude values.

11. A device for determining a DOA of a signal, comprising:
    one or more antennas configured to receive respective first and second UWB waveforms of the signal;
    a memory for storing calibration data; and
    one or more processors configured to define a window in the first and second UWB waveforms received at the one or more antennas, calculate first and second amplitude values of the respective first and second UWB waveforms in the window, calculate an amplitude ratio with the first and second amplitude values, and compare the amplitude ratio with the calibration data stored in the memory to determine the DOA of the signal, wherein the window is defined in a leading portion of the signal.

12. The device for determining a DOA of a signal according to claim 11, wherein the calibration data obtained from a calibration process is established from a leading portion of a calibration signal.

13. The device for determining a DOA of a signal according to claim 12, wherein the calibration data obtained from the calibration process is stored in a lookup table.

14. The device for determining a DOA of a signal according to claim 12, wherein the calibration data obtained from the calibration process is stored as a function derived from plotting the calibration data as a calibration curve.

15. The device for determining a DOA of a signal according to any one of claims 12 to 14 inclusive, wherein the calibration process is performed in a free space environment.

16. The device for determining a DOA of a signal according to claim 11, wherein the one or more processors are further configured to accumulate the first and second UWB waveforms received at the UWB transceiver.

17. The device for determining a DOA of a signal according to claim 11, wherein the window is defined by sample size.

18. The device for determining a DOA of a signal according to claim 11, wherein the first and second amplitude values are one or more of a peak to peak value and a root mean square (RMS) value of the respective first and second UWB waveforms in the window.

19. The device for determining a DOA of a signal according to claim 11, wherein the processor is further configured to compute a difference between the first and second amplitude values and a sum of the first and second amplitude values.

20. The device for determining a DOA of a signal according to claim 19, wherein the processor is further configured to compute a ratio of the difference to the sum of the first and second amplitude values.

21. A system for determining a DOA of a signal, comprising:
   a transponder for generating the signal in response to receipt of a UWB pulse; and
   a transceiver arranged to receive the signal generated by the transponder, the transceiver being a device for determining the DOA of the signal according to any one of claims 11 to 20 inclusive.

* * * * *